United States Patent [19]

Foley

[11] Patent Number: 4,755,843
[45] Date of Patent: Jul. 5, 1988

[54] TEMPERATURE CONTROL SYSTEM FOR A PHOTOGRAPHIC PROCESSOR

[75] Inventor: Walter D. Foley, Rochester, N.Y.

[73] Assignee: Eastman Kodak Company, Rochester, N.Y.

[21] Appl. No.: 60,893

[22] Filed: Jun. 12, 1987

[51] Int. Cl.[4] ............................................. G03D 3/02
[52] U.S. Cl. ........................................ 354/299; 354/324
[58] Field of Search ............... 354/299, 320, 321, 322, 354/324; 219/331

[56] References Cited

U.S. PATENT DOCUMENTS

| | | | |
|---|---|---|---|
| 1,967,889 | 7/1934 | Kitroser | 354/299 |
| 3,526,272 | 7/1968 | Watts et al. | 165/39 |
| 3,613,547 | 10/1971 | Snarr | 354/321 |
| 4,138,607 | 2/1979 | Engelmann | 219/485 |
| 4,153,363 | 5/1979 | Albano | 354/299 |
| 4,160,153 | 7/1979 | Melander | 219/485 |
| 4,316,663 | 2/1982 | Fischer | 354/299 |
| 4,625,096 | 11/1986 | Fletcher | 219/331 |

FOREIGN PATENT DOCUMENTS 61-153647A  7/1986  Japan ................................ 354/299

*Primary Examiner*—A. A. Mathews
*Attorney, Agent, or Firm*—Jeffrey L. Brandt

[57] ABSTRACT

Method and apparatus are provided for controlling the temperature of processing fluids in photographic processors. A tank of developing fluid includes a dedicated temperature sensor, heating element, and control circuit for controlling the heating element responsive to the temperature sensor. A tail portion of the processor, including at least two additional tanks of processing fluids, includes a single temperature sensor disposed in a selected one of the fluids. Each tank includes a heating element, each heating element being sized in proportion to the corresponding volume of processing fluid to be heated thereby. A single control circuit is provided, responsive to the single temperature sensor, for controlling both of the heating elements.

28 Claims, 4 Drawing Sheets

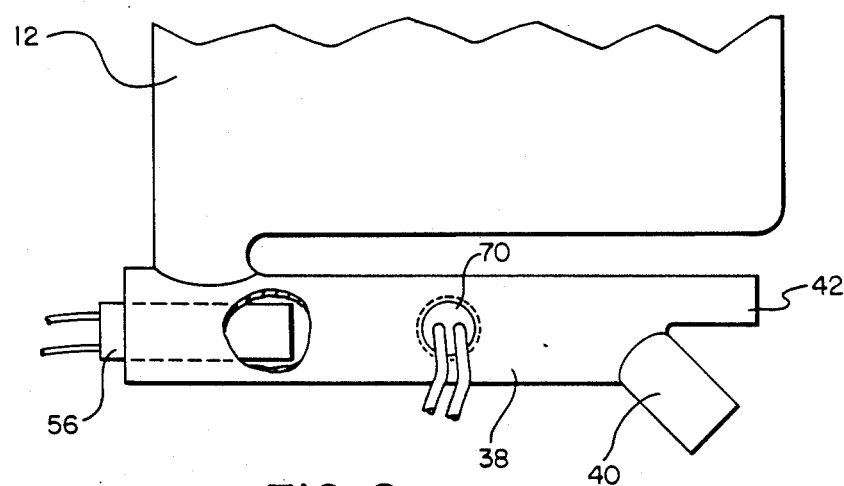
FIG. 2
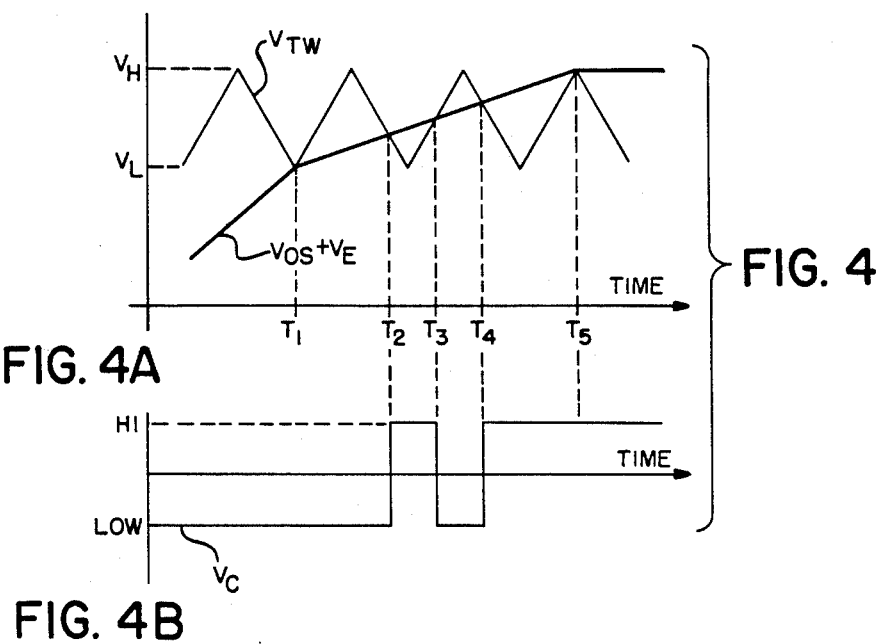
FIG. 4A
FIG. 4B
FIG. 4

TEMPERATURE CONTROL SYSTEM FOR A PHOTOGRAPHIC PROCESSOR

BACKGROUND OF THE INVENTION

The present invention relates generally to temperature control apparatus for liquids and more specifically to temperature control apparatus for use in photographic processors.

Photographic processors, of the type used to develop conventional photographic film or paper, utilize a plurality of processing fluids which must be maintained at precise temperatures. A typical photographic paper processor includes, for example, six discrete tanks of processing fluids including: a developing fluid, a bleaching fluid, and four separate tanks of stabilizing fluids. The temperature of each of these fluids must be maintained, within a certain tolerance, at a precise setting. Further, the fluids can't be intermixed, so it is necessary to separately maintain the temperature of each fluid in each tank.

The maintenance of the individual fluid temperatures is accomplished, in some modern photographic processors, by providing a separate temperature control system for each tank of fluid. Each temperature control system includes its own temperature sensor situated in the fluid, its own heating element also situated in the fluid, and its own control electronics connected to both the temperature sensor and the heater. Each temperature control system operates by monitoring the temperature of the sensor with the control electronics, and using the control electronics to actuate the heating element as required. While providing extremely precise temperature control, the use of such individual temperature control systems is expensive. Further, they require a substantial quantity of complex electronic parts, adding to the complexity, bulk, and difficulty in maintaining the photographic processors employing them.

It would thus be desirable to provide a photographic processor including temperature control apparatus which is capable of maintaining fluid temperatures within required tolerances using a minimal amount of relatively simple and economical hardware.

OBJECTS OF THE INVENTION

The principal object of the present invention is to provide a simple, economical, and accurate temperature control method and apparatus for controlling processing fluid temperatures in photographic processors.

Another object of the present invention is to provide a photographic processor wherein the temperature control apparatus comprises relatively fewer temperature sensors and related control circuit components than is typically found in the prior art.

A further object of the present invention is to provide a photographic processor including temperature control apparatus which controls critical temperatures of certain processing fluids to a higher degree of tolerance than less critical temperatures of other processing fluids.

SUMMARY OF THE INVENTION

A new and improved photographic processor comprises a first tank containing a heated first processing fluid, and second and third tanks containing second and third processing fluids, respectively. Temperature controlling means are provided, responsive to the temperature of a selected one of the second or third processing fluids, for controlling the temperatures of both said second and third processing fluids. This temperature controlling means includes a single temperature sensor disposed in thermal relationship with one of the second or third processing fluids, and first and second heating elements disposed in thermal relationship with, and having heat outputs proportional to, the volume of the second and third processing fluids, respectively.

BRIEF DESCRIPTION OF THE DRAWINGS

While the specification concludes with claims defining the features of the invention that are regarded as novel, it is believed that the invention, together with further objects thereof, will be better understood from a consideration of the following description in conjunction with the drawing figures, in which like reference numerals are carried forward, and in which:

FIG. 2 shows a partial, plan view of a tank from FIG. 1;

FIGS. 4A and 4B show graphs illustrating operating principles of the circuits of FIG. 3.

DETAILED DESCRIPTION OF PREFERRED EMBODIMENTS OF THE INVENTION

Figure 1:
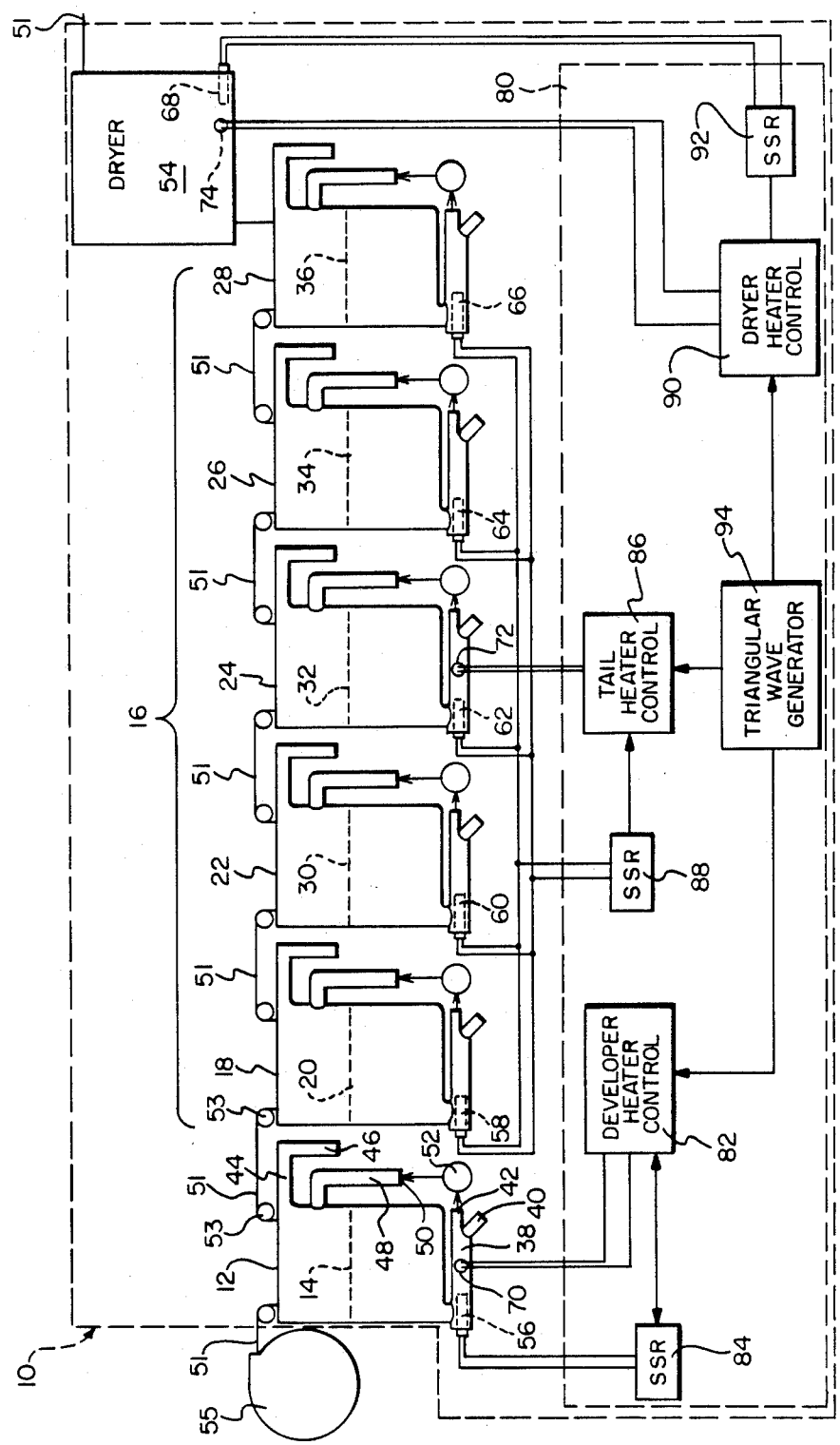
FIG. 1 shows a schematic view of a paper processor constructed in accordance with the present invention.

Referring now to FIGS. 1 and 2, a photographic paper processor 10 includes a tank 12 of developing fluid 14. A "tail" portion 16 of processor 10 comprises five tanks: a tank 18 containing bleach/fix 20, and four tanks 22, 24, 26, 28 containing first, second, third and fourth stabilizing fluids, 30, 32, 34, 36, respectively. Tanks 12, 18, and 22–28 are substantially identical except for size and fluid capacity, which will be discussed in detail below. For purposes of explanation, only tank 12 will be described and labeled in detail.

Tank 12 comprises, along its lower edge (as viewed in FIGS. 1 and 2), a first recirculating conduit 38 including a drain outlet 40 and a recirculating outlet 42. Proximate its upper edge, tank 12 includes an overflow conduit 44 having an overflow outlet 46 therein. Underlying overflow conduit 44, but still proximate the upper edge of tank 12, is a second recirculating conduit 48 including an inlet 50. Connected between recirculating outlet 42 and recirculating inlet 50, with fluid-tight seals (not shown), is a pump 52. Tanks 12, 18, 22–28 are preferably constructed of a thermally insulating, chemically resistant plastic such as Noryl, available from General Electric Co. Pump 52 comprises, for example, a model 15570 pump available from Gorman-Rupp Ind., a division of Gorman-Rupp Co.

Further contained in photographic processor 10 is a drying compartment 54. Drying compartment 54 comprises a hot air dryer of a type well known to those of ordinary skill in the art. For purposes of explanation, a continuous web of photographic paper 51 is shown being transported by rollers 53 from a paper holder 55 sequentially through the fluids in tanks 12, 18, 22–28, drying compartment 54, and out of printer 10.

Disposed in first recirculating conduit 38 of each tank 12, 18, 22–28, and inside drying compartment 54, is an electrically resistive heating element, the seven heating elements being indicated at 56, 58, 60, 62, 64, 66, 68, respectively. Heating elements 56-58 are identical excepting in size which is discussed in detail below. As used herein with reference to heating elements, the term "size" is defined as the heating capacity in watts of a heating element. Each heating element 56-68 is disposed in thermal relationship with the fluid contained in its corresponding tank, or, in the case of drying compartment 54, with the air in the dryer.

A first thermistor 70 is disposed in recirculating conduit 38 of tank 12, between heating element 56 and recirculating outlet 42. A second thermistor 72 is disposed in the same region of tank 24. A third thermistor 74 is disposed in drying compartment 54. It will be appreciated that thermistor 70, 72 are disposed in thermal relationship with developer fluid 14 and second stabilizer fluid 32, respectively, while thermistor 74 is disposed in thermal relationship with the air in drying compartment 54.

Further included in paper processor 10 is an electronic temperature control circuit, indicated by dashed-line 80. Temperature control circuit 80 includes a developer heater control circuit 82 connected to thermistor 70, and to heating element 56 via an intermediately disposed solid-state relay (SSR) 84. A heater control circuit 86 for tail portion 16 of paper processor 10 is connected to thermistor 72, and to heating elements 58-66 via a single, intermediately disposed SSR 88. A dryer heater control circuit 90 is connected to thermistor 74, and to heating element 68 via a third, intermediately disposed SSR 92. As will be described in further detail below, control circuits 82, 86, and 90 are identical in construction. A periodic wave generator, in this preferred embodiment of the invention comprising triangular wave generator 94, is connected to developer, tail, and dryer heater control circuits 82, 86, and 90, respectively. Thermistors 70, 72, and 74 each comprise, for example, model UUA41J1 elements disposed in model H110 cases as available from the Fenwall Electronics Co. Heaters 56-68 each comprise, for example, Firerod type heaters available from Watlow Co.

Figure 3:
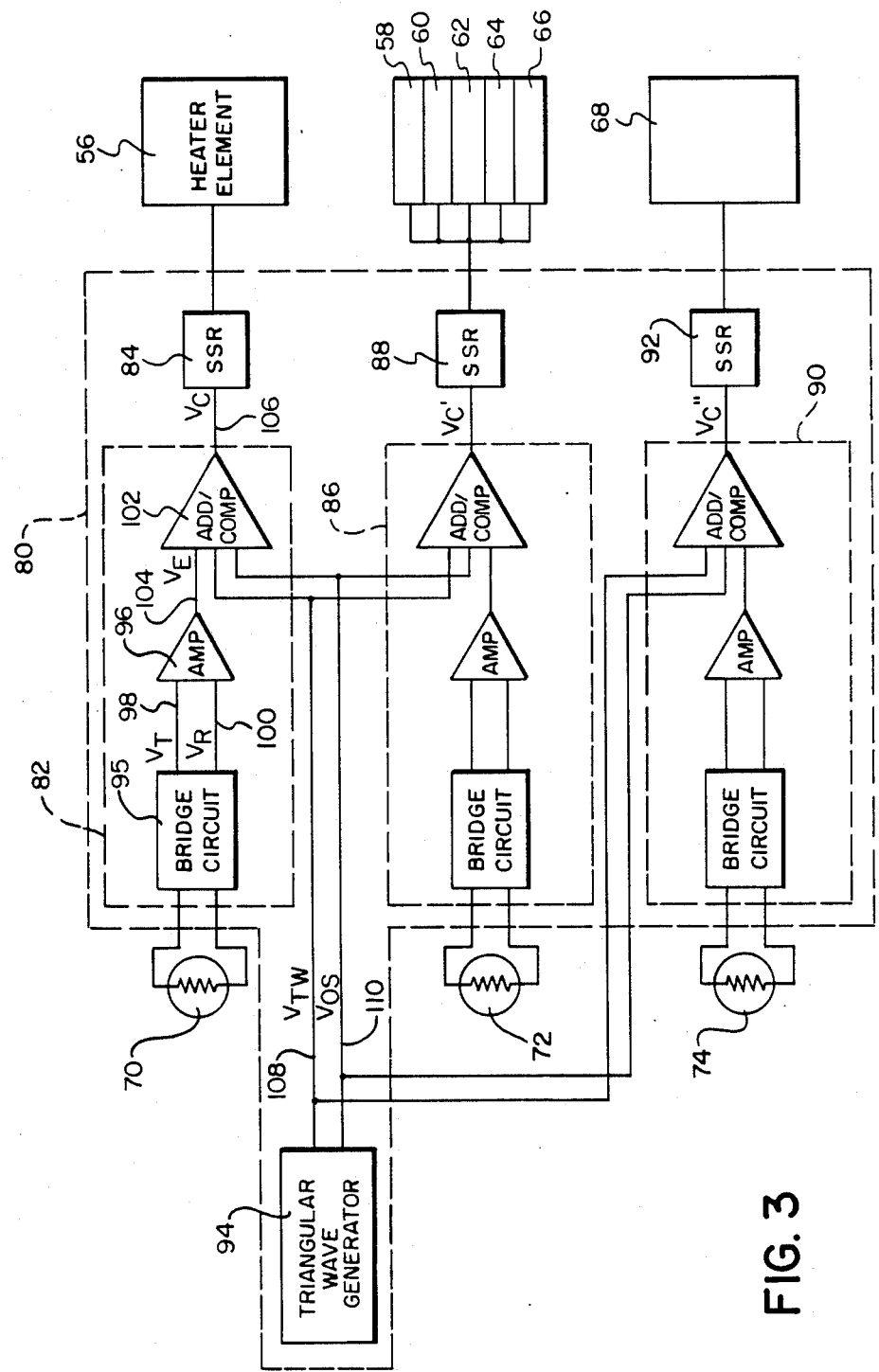
FIG. 3 shows a schematic view of the heater controllers and triangular wave generator from FIG. 1.

Referring now to FIG. 3, developer control circuit 82 includes an electronic bridge circuit 95 having thermistor 70 connected in an arm thereof. The output of bridge circuit 95 is connected to the input of a voltage amplifier 96 via a pair of conductors 98, 100. The output of amplifier 96 is connected to one input of an adder/comparator (ADD/COMP) 102 via a conductor 104, the output of the ADD/COMP in turn being connected to SSR 84 via a conductor 106. Triangle wave generator 94 includes two outputs connected to second and third inputs of ADD/COMP 102 via conductors 108, 110, respectively. As will be described in detail below, triangle wave generator 94 is used to generate two signals, a signal $V_{TW}$ of periodic waveform (preferably triangular) on conductor 108, and a D.C. level offset voltage $V_{OS}$ on conductor 110. Control circuits 86 and 90 are identical in construction to developer control circuit 82.

Triangle wave generator 94 comprises any suitable electronic circuit, many of which are known to those skilled in the art. It will be understood that offset voltage $V_{OS}$ needn't be derived from triangular wave generator 94, but may comprise a separate, suitable circuit for generating a D.C. level. Bridge circuit 94 comprises, for example, precision metal film resistors connected in a bridge configuration well known to those skilled in the art. Amplifier 96 comprises, for example, a model LF412AN integrated circuit available from National Semiconductor Co. ADD/COMP 102 comprises, for example, an LF412AN integrated circuit configured as an adder, and an LM319N integrated circuit configured as a comparator, both integrated circuits being commercially available from the National Semiconductor Co. ADD/COMP 102 functions to sum the inputs on conductors 104 and 110, and to compare the sum to the input on 108. If the sum of the inputs on 104, 110 is less than the input on 108, the output on conductor 106 goes low. If the sum is greater than the single input, the output goes high.

In operation, described now with respect to FIGS. 1 and 2, tanks 12, 18, 22-28 are filled with fluids of the type described above, and pumps 52 are actuated to recirculate the fluid within each tank. As illustrated in FIG. 1, the fluid in each tank 12, 18, 22-28 recirculates from the interior of the tank, down and out through recirculating conduit 38 and outlet 42. The fluid is then pumped through pump 52, into recirculating inlet 50, through second recirculating conduit 48 and back into the tank. The selection of appropriate fluids 14, 20, 30-36, and the filling of the corresponding tanks 12, 18, 22-28, are well known to those skilled in the art and will not be discussed herein. Further, control circuits 86 and 90 being identical in construction and operation to control circuit 82, for purposes of explanation, only the operation of control circuit 82 will be described in detail herein.

Before operating paper processor 10 to develop photographic paper 51, the size, or heating capacity, of heaters 56-66 are selected. As a first selection criteria, the size of each heating element 58-66 in processor tail portion 16 is selected to be proportional to the corresponding volume of liquid 20, 30-36 to be heated. For example, and without limitation, suppose tank 18 contains 3 gallons of bleach/fix fluid 20, and heating element 58 is selected to generate 300 watts of heat. Then, for example, if tank 22 contains 2 gallons of first stabilizing fluid 30, heating element 60 is selected to provide 200 watts of heat (i.e. 200 gal./300 gal. × 300 watts = 200 watts). The remaining heating elements 62, 64, 66 are similarly sized in proportion to the quantity of fluid 32-36 contained in their respective tanks 24-28. As a second selection criteria, the size of heaters 56-66 are preferably selected so as to be able to heat their corresponding fluids 14, 20, 30-36 from an ambient temperature of about 21 degrees centigrade to desired operating temperatures in a predetermined period of time. In the preferred embodiment of the invention, this preselected period of time is less than one hour. Heating element 68 in drying compartment 54 is selected to provide sufficient heat to dry wet paper.

Referring now to FIGS. 3 and 4, in a manner well known to those skilled in the art, bridge circuit 95 outputs two separate voltages. A first voltage, indicated as $V_T$ on conductor 98, is representative of the temperature sensed in developing fluid 14 by thermistor 70. A second voltage, indicated as $V_R$ on conductor 100, is representative of a desired, predetermined operating temperature for developing fluid 14. Again as is well known to those skilled in the art, voltage $V_R$ is selected by adjustment of a variable resistance (not shown) in bridge circuit 95. Bridge circuit 95 is adjusted such that when the temperature sensed by thermistor 70 equals the predetermined operating temperature for developing fluid 14, $V_T = V_R$ (i.e. the "bridge is balanced"). Amplifier 96 senses the difference between voltages $V_T$ and $V_R$, and generates a proportional, amplified, error voltage $V_E$ indicated on conductor 104.

Triangle wave generator 94 generates two voltages supplied to ADD/COMP 102, triangular wave $V_{TW}$, of uniform period, indicated on conductor 108, and offset voltage $V_{OS}$ indicated on conductor 110. Triangular wave $V_{TW}$, as shown in FIG. 4A, varies between upper and lower voltages $V_H$ and $V_L$, respectively. The magnitude of offset voltage $V_{OS}$ is selected such that, when bridge circuit 95 is balanced, and $V_T = V_R$, then $V_{OS} + V_E = V_H$. That is, with bridge circuit 94 balanced, the sum of $V_{OS}$ and $V_E$ as performed by ADD/COMP 102 is equal in magnitude to the highest magnitude of triangular wave $V_{TW}$.

As best shown in FIG. 4A, ADD/COMP 102 sums offset voltage $V_{OS}$ with error voltage $V_E$, this sum being represented by the appropriately labeled plot. ADD/COMP 102 then compares the summation $V_{OS} + V_E$ with $V_{TW}$, and responsively generates a control voltage $V_C$ on conductor 106. When the summation $V_{OS} + V_E$ is less than $V_{TW}$, than $V_C$ is a logical 0 (or low), and SSR 84 is conditioned to actuate heating element 56. When the summation $V_{OS} + V_E$ is equal to or greater than $V_{TW}$, then $V_C$ is a logical 1 (or high), and SSR 84 is conditioned to shut off heating element 56.

As best shown in FIG. 4B, when $V_{OS} + V_E$ is less than the lowest level $V_L$ of triangular wave $V_{TW}$, which is true for time T is less than $T_1$, control voltage $V_C$ is low and heating element 56 is powered on. When $V_{OS} + V_E$ is greater than or equal to $V_{TW}$, as occurs for time T is greater than $T_5$, control voltage $V_C$ goes high and heater element 56 is inactivated. When $V_{OS} + V_E$ is greater than $V_L$ and less than $V_H$, heating element 56 is controlled according to the periodic nature of triangular wave $V_{TW}$. More specifically, $V_C$ is low when $V_{OS} + V_E$ is less than $V_{TW}$, a condition which occurs during the time T is greater than $T_1$ and less than $T_2$, and T is greater than $T_3$ and less than $T_4$. $V_C$ goes to the high condition when $V_{OS} + V_E$ is greater than $V_{TW}$, a condition which occurs when time T is greater than $T_2$ and less than $T_3$, and when T is greater than $T_4$ and less than $T_5$.

In summary, as will be apparent from a consideration of FIGS. 4A and 4B, when developing fluid 14 is relatively cold (i.e. when $V_{OS} + V_E$ is less than $V_L$), heating element 56 is on all of the time. When the temperature of developing fluid 14 approaches the predetermined operating temperature (i.e. when $V_{OS} + V_E$ is greater than $V_L$ but less than $V_H$), heater 56 is on only part of the time, as determined by the period of $V_{TW}$, slowing down the rate of heating. When the temperature of developing fluid 14 equals or exceeds the predetermined temperature (i.e. $V_{OS} + V_E$ is equal to or greater than $V_H$), heating element 56 is off. The control provided by temperature control circuit 80 is thus very accurate, heating the cold temperature quickly to operating temperature while preventing overshoot. Temperature control circuit 80 further operates to very closely maintain the desired operating temperature.

While the accurate temperature control of developing fluid 14 requires the use of a dedicated thermistor 70 and control circuit 82, it has been determined that all of the fluids in tail portion 16 of paper processor 10 can be adequately controlled using single thermistor 72, a sensitive, accurate control circuit 86 such as the type described above, and by the appropriate, proportional sizing of heating elements 56-66, as described above.

Tail heater control circuit 86 functions identically to developer heater control circuit 82, with the exception that its input is provided by thermistor 72, and its control signal $V_C$ is used to actuate SSR 88. Thus, tail heater control circuit 86 is used to control the temperature of all five tail fluids 20, 30-36 in their corresponding tanks 18, 22-28. This is accomplished by using $V_C$, in the manner described above, to condition SSR 88 to actuate all five parallel-connected heating elements 58-66.

As a matter of example, and without limitation, an experiment was conducted utilizing the parameters set out in Table 1 below:

| TANK | FLUID VOLUME | HEATER WATTAGE |
|---|---|---|
| Developer 12 | 3 Gallons | 300 Watts |
| Bleach/fix 18 | 3 Gallons | 300 Watts |
| Stabilizer 22 | 1.5 Gallons | 150 Watts |
| Stabilizer 24 | 1.5 Gallons | 150 Watts |
| Stabilizer 26 | 1.5 Gallons | 150 Watts |
| Stabilizer 28 | 1.5 Gallons | 150 Watts |

The temperature of developing fluid 14 in tank 12 was maintained at 35 degrees centigrade plus-or-minus 0.15 degree centigrade. The temperatures of the tail fluids, bleach/fix 30 and stabilizers 32-36, were maintained at 35 degrees centigrade plus-or-minus 3.0 degrees centigrade, well within operational limits. Further, the various fluids were brought up to operating temperatures in ½ hour after an overnight shut-down, and within 1 hour after refilling with fresh fluids having ambient temperatures of about 21 degrees centigrade.

Dryer heater control circuit 90 operates identically to developer heater control circuit 82 as described above, control signal $V_C$, actuating SSR 92 and heating element 68 responsive to the temperature sensed by thermistor 74. As an alternate embodiment of the present invention, the bridge circuit 94 in dryer heater control circuit 90 can be implemented with a variable resistor in one arm thereof, permitting the dryer temperature to be varied.

Figure 5:
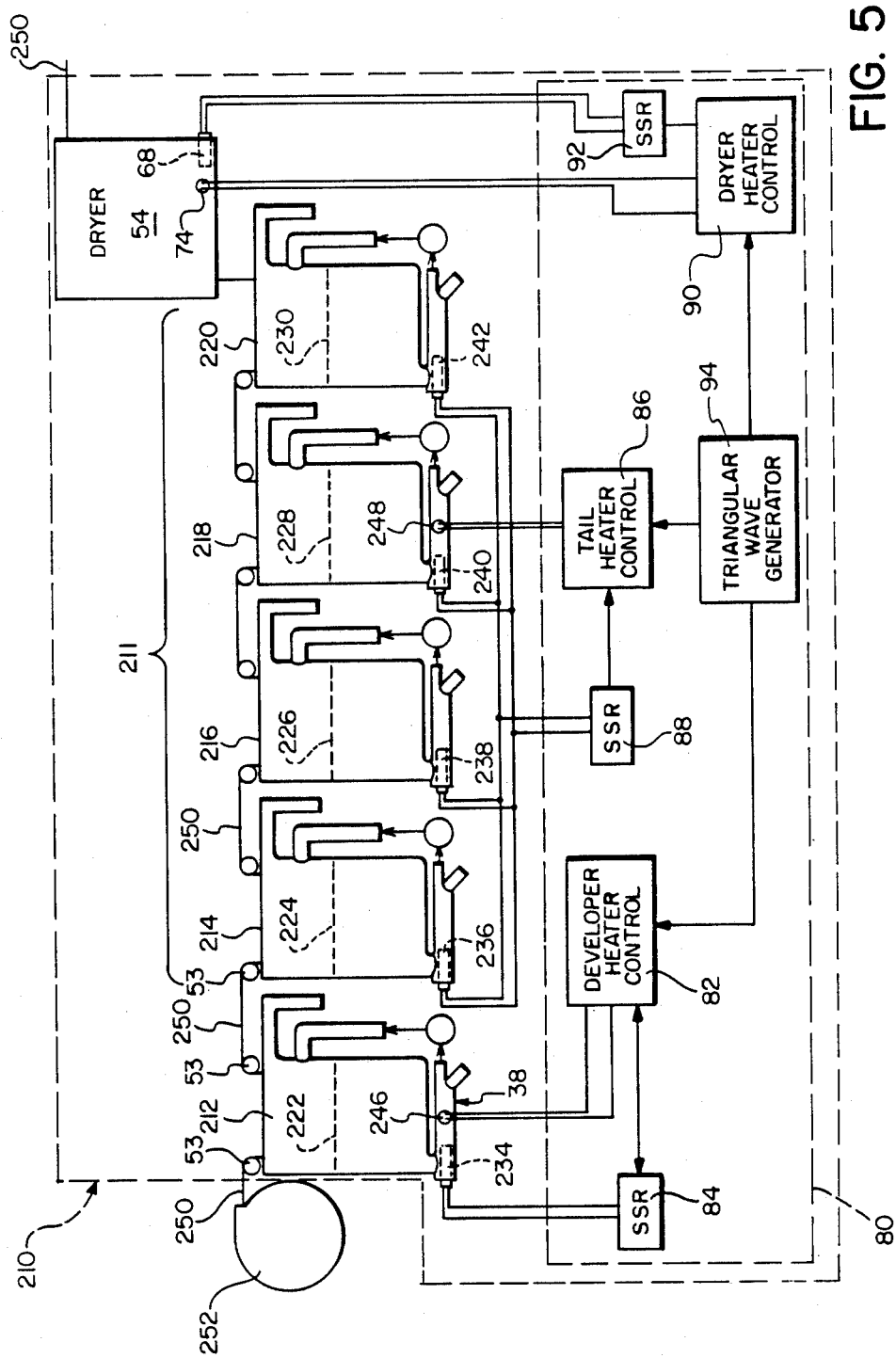
FIG. 5 shows a photographic film processor constructed in accordance with the present invention.

Referring now to FIG. 5, a photographic film processor 210 is shown constructed in accordance with the present invention. Film processor 210 includes a tail portion 211, and is identical in structure to paper processor 10 (FIGS. 1-3), with the exception of the quantities and types of fluids used therein. Film processor 210 includes five tanks 212-220, tank 212 containing a developing fluid 222, tank 214 containing a bleach 224, tanks 216 and 218 each containing fixing fluids 226 and 228 respectively, and tank 220 containing a stabilizing fluid 230. Film processor 210 further includes a drying compartment 54 identical in construction and operation to the like-numbered drying compartment described above. For purposes of explanation, a continuous web of film 250 is shown being carried by rollers 53 out of a paper holder 252, through the processing fluids in tanks 212-220, through dryer 54, and out of processor 210.

Each tank 212-220 is identical in construction to tanks 12, 18, 20-28 described above, and each includes a heating element 234-242, respectively, in the first recirculating conduit 38 thereof. A first thermistor 246 is disposed in the recirculating conduit 38 of developing tank 212, and a second thermistor 248 is disposed in the like region of second fixer tank 228. Temperature control circuit 80 is identical in construction and operation to the like-numbered temperature control circuit described above.

In operation, developer heater control circuit 82 operates to control the temperature of developing fluid 222 via heating element 234 and SSR 84 in a manner identical to that described above. Tail heater control circuit 86 functions to control the temperature of fluids 224-230 in tanks 214-220, respectively, via SSR 88 and parallel-connected heating elements 236-242, in a manner identical to that described above. Dryer control circuit 90 operates to control the temperature of the air in dryer compartment 54, also in a manner identical to that described above.

For example, and without limitation, photographic film processor 210 was tested using the parameters set out in Table 2 below:

| TANK | FLUID VOLUME | HEATER WATTAGE |
| --- | --- | --- |
| Developer 12 | 3 Gallons | 300 Watts |
| Bleach 214 | 3 Gallons | 300 Watts |
| Fixer 216 | 3 Gallons | 300 Watts |
| Fixer 218 | 3 Gallons | 300 Watts |
| Stabilizer 220 | 3 Gallons | 300 Watts |

It was found that the temperature of developing fluid 222 could be maintained at 37.8 degrees centigrade plus-or-minus 0.15 degree centigrade. The temperatures of the tail fluids, bleach 224, first fixer 226, second fixer 228 and stabilizer 230, could be maintained at 37.8 degrees centigrade, plus-or-minus 3.0 degrees centigrade. These temperatures are well within operational limits. Further, the fluids in the paper processor could be brought up to operating temperature within ½ hour after an overnight shutdown, and within 1 hour after refilling with fresh fluids at an ambient temperature of approximately 21 degrees centigrade There are thus provided photographic film and paper processors including relatively simple temperature control apparatus which controls critical fluid temperatures to a higher tolerance than non-critical fluid temperatures. The control of the less critical temperatures is done using fewer and thus simpler control electronics than is found in other contemporary photographic processors.

While a preferred embodiment of the invention has been illustrated and described, it will be clear that the invention is not so limited. Numerous modifications, changes, variations, substitutions and equivalents will occur to those skilled in the art without departing from the spirit and scope of the present invention.

What is claimed is:

1. A photographic processor comprising:
   a first tank containing a heated first processing fluid;
   second and third tanks containing second and third processing fluids, respectively; and
   temperature controlling means responsive to the temperature of one of said second or third processing fluids for controlling the temperatures of both of the second and third processing fluids;
   said temperature controlling means including a single temperature sensor disposed in thermal relationship with one of said second or third processing fluids;
   said temperature controlling means further including first and second heating elements disposed in thermal relationship with and having heat outputs proportional to the volume of said second and third processing fluids, respectively.

2. The photographic processor of claim 1 and further including control means responsive to said temperature sensor for controlling said first and second heating heating elements to maintain said second and third processing fluids at predetermined temperatures, respectively.

3. A photographic processor comprising:
   a developing tank containing a heated developing fluid;
   at least first and second additional processing tanks containing first and second processing fluids, respectively;
   first temperature sensing means disposed in thermal relationship with a selected one of said first or second processing fluids for sensing the temperature thereof;
   first heating means having a heat output proportional to the volume of said first processing fluid and disposed in thermal relationship with said first processing fluid for heating said first processing fluid;
   second heating means having a heat output proportional to the volume of said second processing fluid and disposed in thermal relationship with said second processing fluid for heating said second processing fluid; and
   first control means responsive to said first temperature sensing means for controlling said first and second heating means so as to maintain said first and second processing fluids at respective predetermined operating temperatures.

4. The photographic processor of claim 3 and further including:
   developer temperature sensing means disposed in thermal relationship with said developing fluid for sensing the temperature of said developing fluid;
   developer heating means disposed in thermal relationship with said developing fluid for heating said developing fluid; and
   developer control means responsive to said developer temperature sensing means for controlling said developer heating means so as to maintain said developing fluid at a predetermined operating temperature.

5. The photographic processor of claim 4 and further including:
   means for generating an electronic control signal having a periodic wave; and
   said developer and first control means each being responsive to said electronic control signal for controlling their respective heating means.

6. The photographic processor of claim 5 wherein each of said control means comprises:
   error signal generating means responsive to one of said temperature sensing means for generating an electronic signal representative of the difference between the temperature of the sensed fluid and the predetermined temperature for that fluid; and
   comparator means responsive to said error signal and said control signal for generating an actuating signal to actuate at least one of said heating means.

7. The photographic processor of claim 6 wherein:
   said developer, first, and second temperature sensing means each comprises a thermistor;
   said error signal generating means comprises an electronic bridge circuit.

8. The photographic processor of claim 5 wherein said periodic wave comprises a triangular wave.

9. The photographic processor of claim 3 wherein:
said photographic processor comprises a photographic paper processor; and
said at least first and second tanks contain bleach/fix fluid and a first stabilizing fluid, respectively.

10. The photographic processor of claim 9 and further including:
at least a third additional processing tank containing a second stabilizing fluid;
third heating means having a heat output proportional to the volume of said second stabilizing fluid and disposed in thermal relationship with said second stabilizing fluid for heating said second stabilizing fluid; and
said first control means further controlling said third heating means;
whereby said first, second, and third heating means are each controlled by said first control means responsive to said first thermistor.

11. The photographic processor of claim 3 wherein:
said photographic processor comprises a film processor; and
said at least first and second processing fluids comprise a bleaching fluid and a fixing fluid 12. The photographic processor of claim 11 and further including:
at least a third tank containing a stabilizing fluid;
third heating means having a heat output proportional to the volume of said stabilizing fluid and disposed in thermal relationship with said stabilizing fluid for heating said stabilizing fluid; and
said first control means further controlling said third heating means;
whereby said first, second, and third heating means are each controlled by said first control means responsive to said first thermistor.

13. The photographic processor of claim 5 and further including:
a drying compartment;
third heating means disposed in said drying compartment for heating the air in said drying compartment;
third temperature sensing means disposed in said drying compartment for sensing the temperature of the air in said drying compartment; and
third control means responsive to said control signal and said third temperature sensing means for controlling said fourth heating element to maintain the air in said dryer compartment at a predetermined operating temperature.

14. The photographic processor of claim 3 wherein each of said first, second, and third tanks includes recirculating means for recirculating the fluid contained therein.

15. A photographic paper processor comprising:
a first tank containing a recirculating developing fluid;
first temperature sensing means disposed in thermal relationship with said developing fluid for sensing the temperature of said developing fluid;
first heating means disposed in thermal relationship with said developing fluid for heating said developing fluid;
means for generating a control signal having a periodic waveform;
first control means responsive to said first temperature sensing means and to said control signal for controlling said first heating means so as to maintain said developing fluid at a predetermined operating temperature;
a second tank containing a recirculating bleach/fix fluid;
second heating means sized in proportion to the volume of said bleach/fix fluid and disposed in thermal relationship with said bleach/fix fluid for heating said bleach/fix fluid;
a third tank containing a recirculating first stabilizing fluid;
third heating means sized in proportion to the volume of said first stabilizing fluid and disposed in thermal relationship with said first stabilizing fluid for heating said first stabilizing fluid;
a fourth tank containing a recirculating second stabilizing fluid;
a fourth heating means sized in proportion to the volume of said second stabilizing fluid and disposed in thermal relationship with said second stabilizing fluid for heating said second stabilizing fluid;
a fifth tank containing a recirculating third stabilizing fluid;
a fifth heating means sized in proportion to the volume of said third stabilizing fluid and disposed in thermal relationship with said third stabilizing fluid for heating said third stabilizing fluid;
a sixth tank containing a recirculating fourth stabilizing fluid;
a sixth heating means sized in proportion to the volume of said fourth stabilizing fluid and disposed in thermal relationship with said fourth stabilizing fluid for heating said fourth stabilizing fluid;
second temperature sensing means disposed in thermal relationship with said second stabilizing fluid for sensing the temperature of said second stabilizing fluid;
second control means responsive to said second temperature sensing means and to said control signal for controlling said second, third, fourth, fifth, and sixth heating means so as to maintain said bleach/fix and first through fourth stabilizing fluids at respective predetermined operating temperatures.

16. The photographic processor of claim 15 wherein each of said first and second temperature sensing means comprises a thermistor.

17. The photographic processor of claim 16 wherein each of said first and second control means comprises:
an electronic bridge circuit including one of said thermistors in an arm thereof; and
comparator means responsive both to the output of said bridge circuit and to said control signal for generating an actuating signal to actuate one of said heating means.

18. The photographic processor of claim 15 wherein said control signal comprises a triangular waveform.

19. The photographic processor of claim 15 and further including:
a drying compartment;
seventh heating means disposed in said drying compartment for heating the air in said drying compartment;
third temperature sensing means disposed in said drying compartment for sensing the temperature of the air in said drying compartment; and
third control means responsive to said control signal and said third temperature sensing means for controlling said seventh heating element to maintain the air in said dryer compartment at a predetermined operating temperature.

20. A photographic film processor comprising:
a first tank containing a recirculating developing fluid;
first temperature sensing means disposed in thermal relationship with said developing fluid for sensing the temperature of said developing fluid;
first heating means disposed in thermal relationship with said developing fluid for heating said developing fluid;
means for generating a control signal having a periodic waveform;
first control means responsive to said first temperature sensing means and to said control signal for controlling said first heating means so as to maintain said developing fluid at a predetermined operating temperature;
a second tank containing a recirculating bleaching fluid;
second heating means sized in proportion to the volume of said bleaching fluid and disposed in thermal relationship with said bleaching fluid for heating said bleaching fluid;
a third tank containing a recirculating first fixing fluid;
third heating means sized in proportion to the volume of said first fixing fluid and disposed in thermal relationship with said first fixing fluid for heating said first fixing fluid;
a fourth tank containing a recirculating second fixing fluid;
a fourth heating means sized in proportion to the volume of said second fixing fluid and disposed in thermal relationship with said second fixing fluid for heating said second fixing fluid;
a fifth tank containing a recirculating stabilizing fluid;
a fifth heating means sized in proportion to the volume of said stabilizing fluid and disposed in thermal relationship with said stabilizing fluid for heating said third stabilizing fluid;
second temperature sensing means disposed in thermal relationship with said second fixing fluid for sensing the temperature of said second fixing fluid;
second control means responsive to said second temperature sensing means and to said control signal for controlling said second, third, fourth, and fifth heating means so as to maintain said bleach, first and second fixing, and stabilizing fluids at respective predetermined operating temperatures.

21. The photographic processor of claim 20 wherein each of said first and second temperature sensing means comprises a thermistor.

22. The photographic processor of claim 21 wherein each of said first and second control means comprises:
an electronic bridge circuit including one of said thermistors in an arm thereof; and
comparator means responsive both to the output of said bridge circuit and to said control signal for generating an actuating signal to actuate one of said heating means.

23. The photographic processor of claim 20 wherein said control signal comprises a triangular waveform.

24. The photographic processor of claim 20 and further including:
a drying compartment;
sixth heating means disposed in said drying compartment for heating the air in said drying compartment;
third temperature sensing means disposed in said drying compartment for sensing the temperature of the air in said drying compartment; and
third control means responsive to said control signal and said third temperature sensing means for controlling said sixth heating element to maintain the air in said dryer compartment at a predetermined operating temperature.

25. A method of controlling the temperatures of fluids in a photographic processor comprising the steps of:
providing a first tank containing a heated first processing fluid;
providing second and third tanks containing second and third processing fluids, respectively; and
controlling responsive to the temperature of one of said second or third processing fluids the temperatures of both of said second and third processing fluids by sensing the temperature of one of said second or third processing fluids, and disposing in thermal relationship with said second and third processing fluids first and second heating elements having heat outputs proportional to the volume of said second and third processing fluids, respectively.

26. The method of claim 25 wherein said controlling step further comprises controlling responsive to said sensing step said first and second heating heating elements to maintain said second and third processing fluids at predetermined temperatures, respectively.

27. A method of controlling the temperature of fluids in a photographic processor comprising the steps of:
providing a heated developing fluid;
providing at least first and second additional processing fluids;
sensing the temperature of said first processing fluid;
generating a periodic wave; and
controlling responsive to said sensing step and said periodic wave the temperatures of said first and second processing fluids so as to maintain said first and second processing fluids at respective predetermined operating temperatures.

28. The method of claim 27 wherein said controlling step comprises the steps of:
generating responsive to said sensing step an error signal representative of the difference between the temperature of the sensed fluid and the predetermined temperature for that fluid; and
heating responsive to said error signal and said control signal at least one of said processing fluids.

* * * * *